Figure 5:
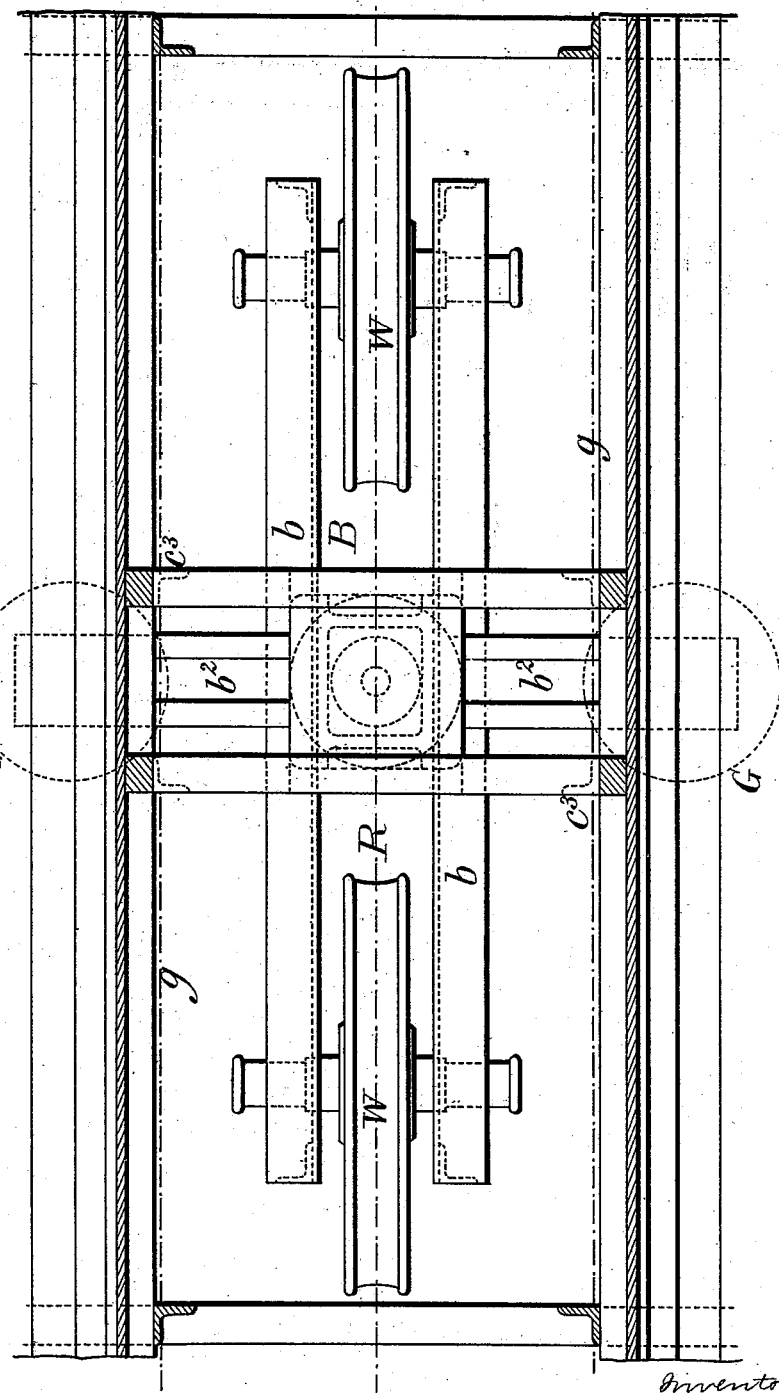

(No Model.) 10 Sheets—Sheet 1.
F. B. BEHR.
ELECTRIC LOCOMOTIVE FOR ELEVATED RAILWAYS.
No. 531,499. Patented Dec. 25, 1894.
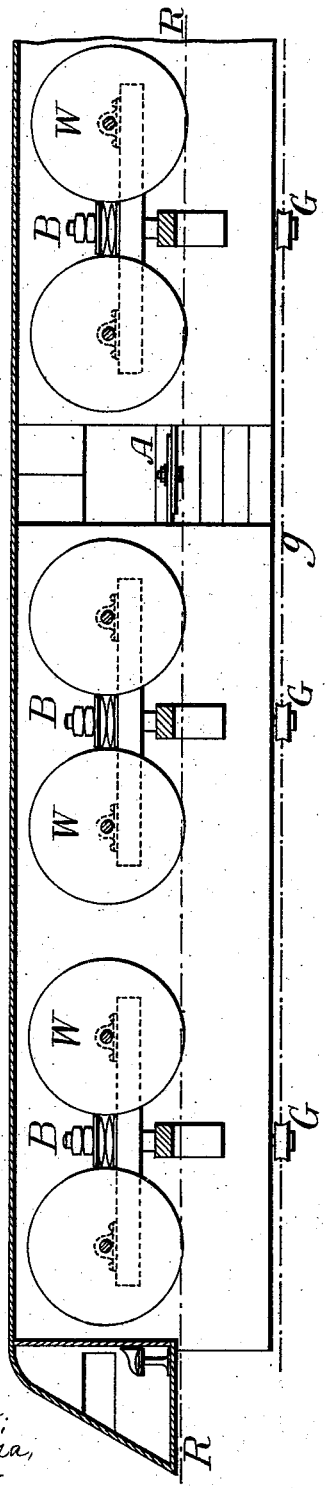
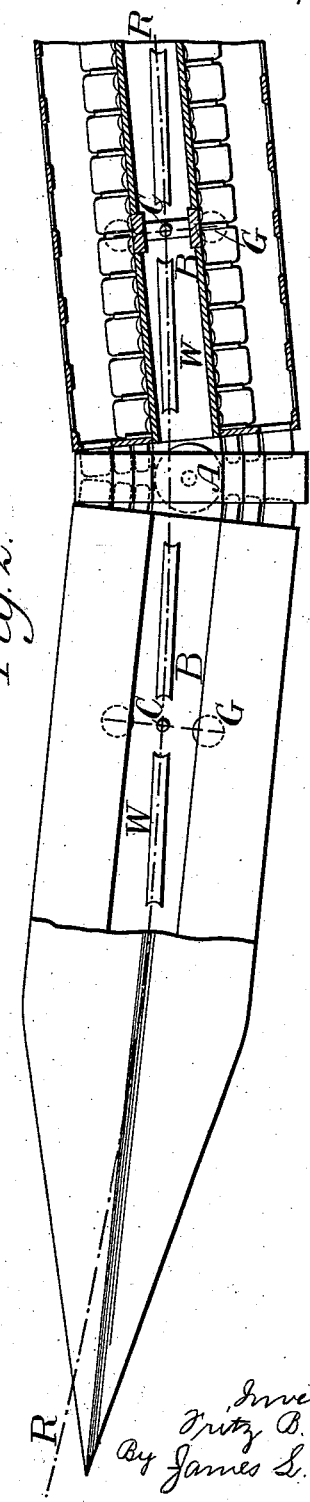

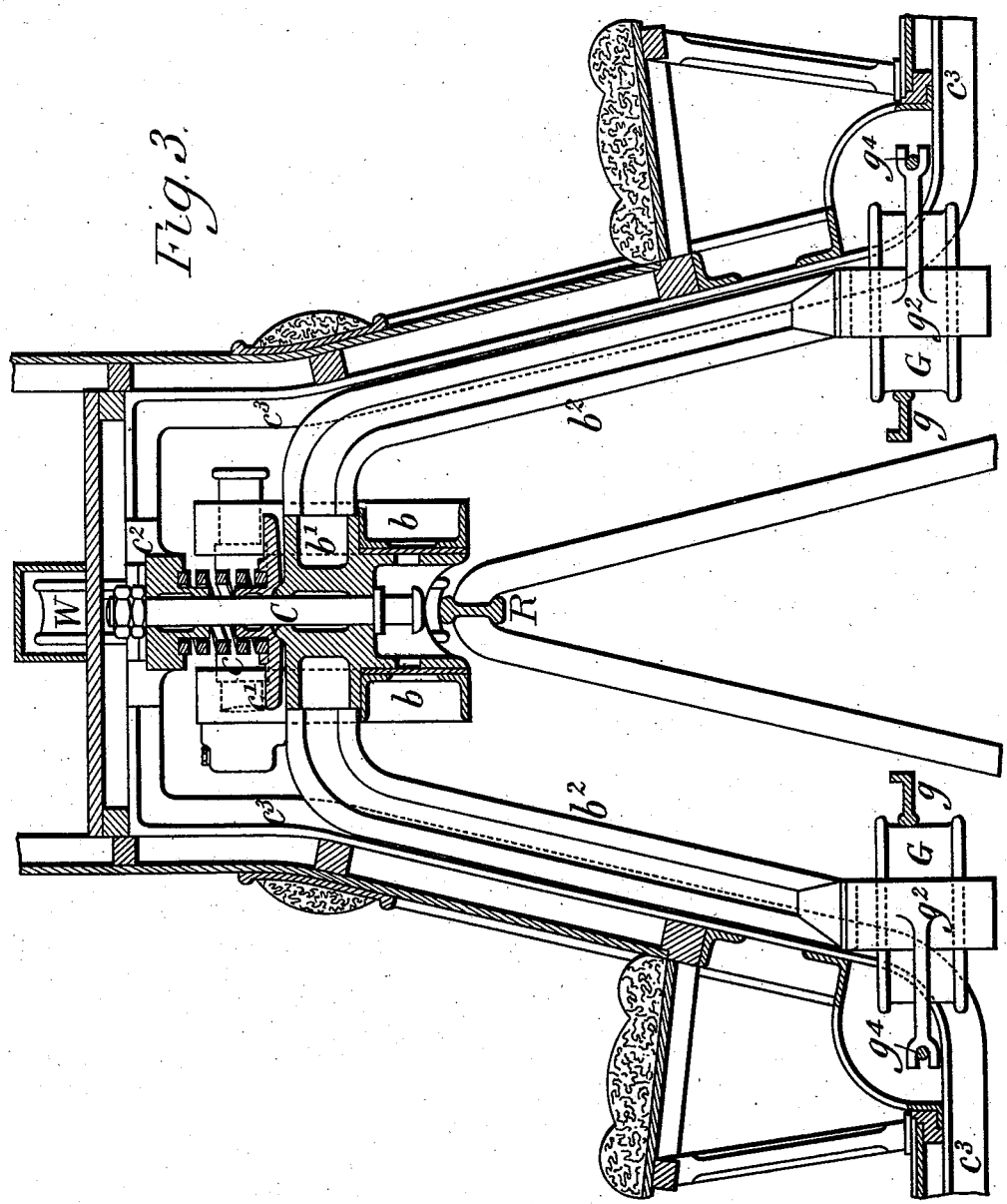

(No Model.)  F. B. BEHR.  10 Sheets—Sheet 3.
ELECTRIC LOCOMOTIVE FOR ELEVATED RAILWAYS.
No. 531,499.  Patented Dec. 25, 1894.
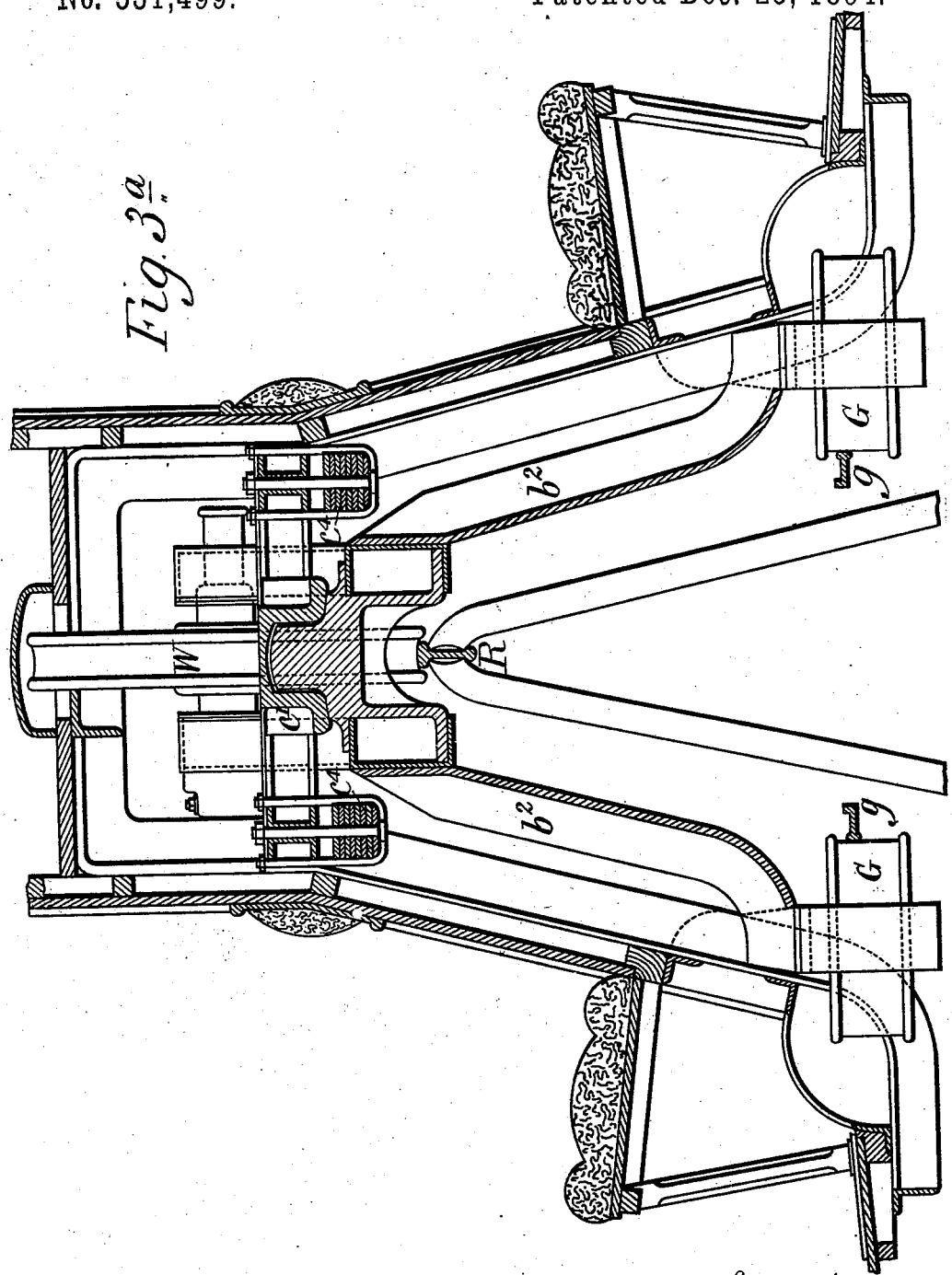

(No Model.) 10 Sheets—Sheet 4.
F. B. BEHR.
ELECTRIC LOCOMOTIVE FOR ELEVATED RAILWAYS.
No. 531,499. Patented Dec. 25, 1894.
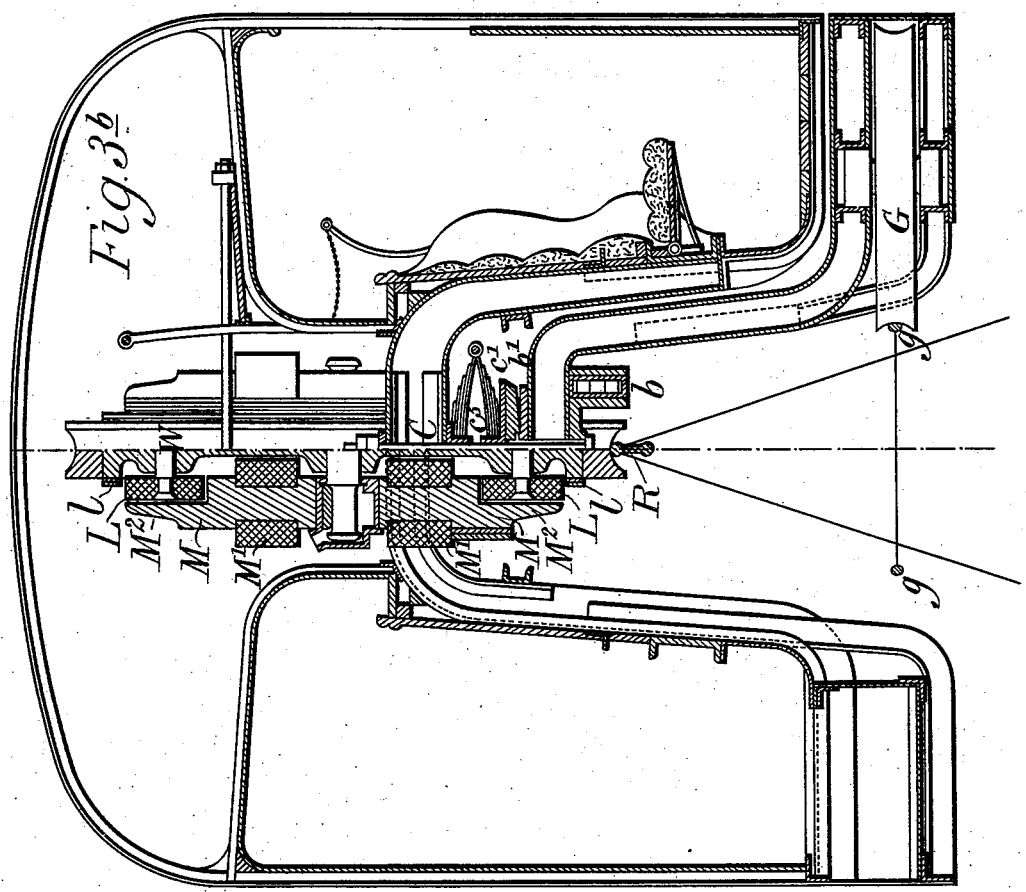

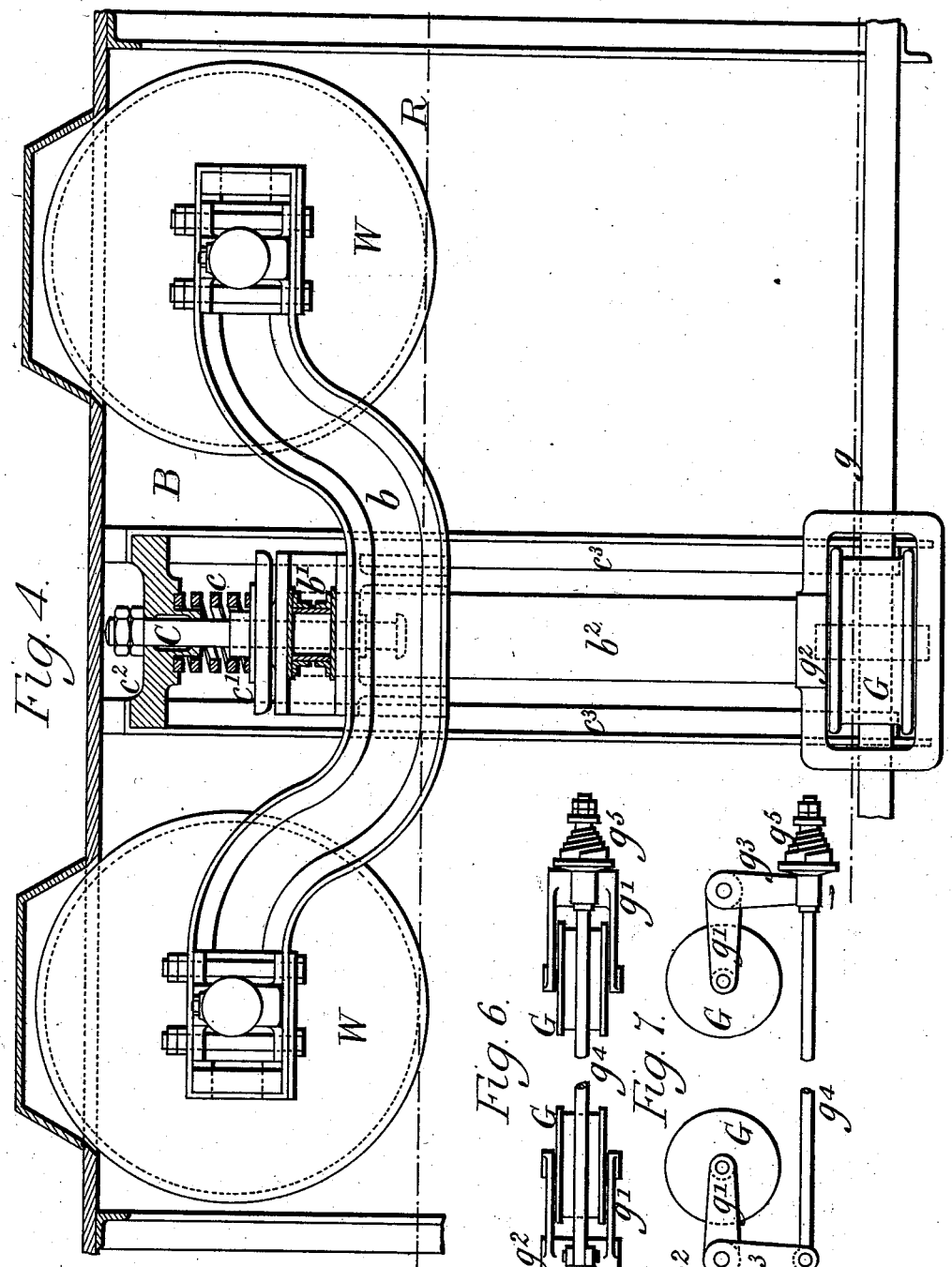

(No Model.) 10 Sheets—Sheet 6.
F. B. BEHR.
ELECTRIC LOCOMOTIVE FOR ELEVATED RAILWAYS.
No. 531,499. Patented Dec. 25, 1894.
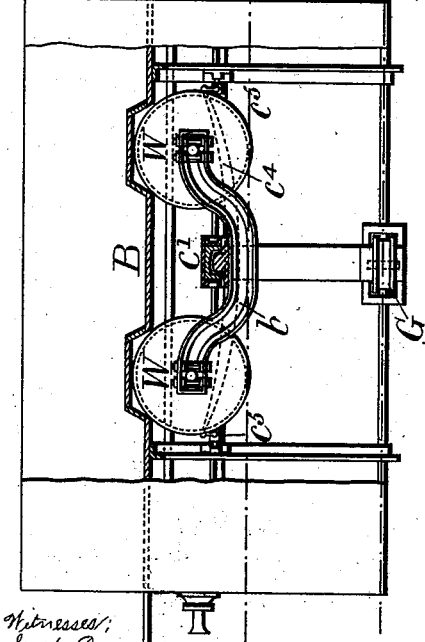
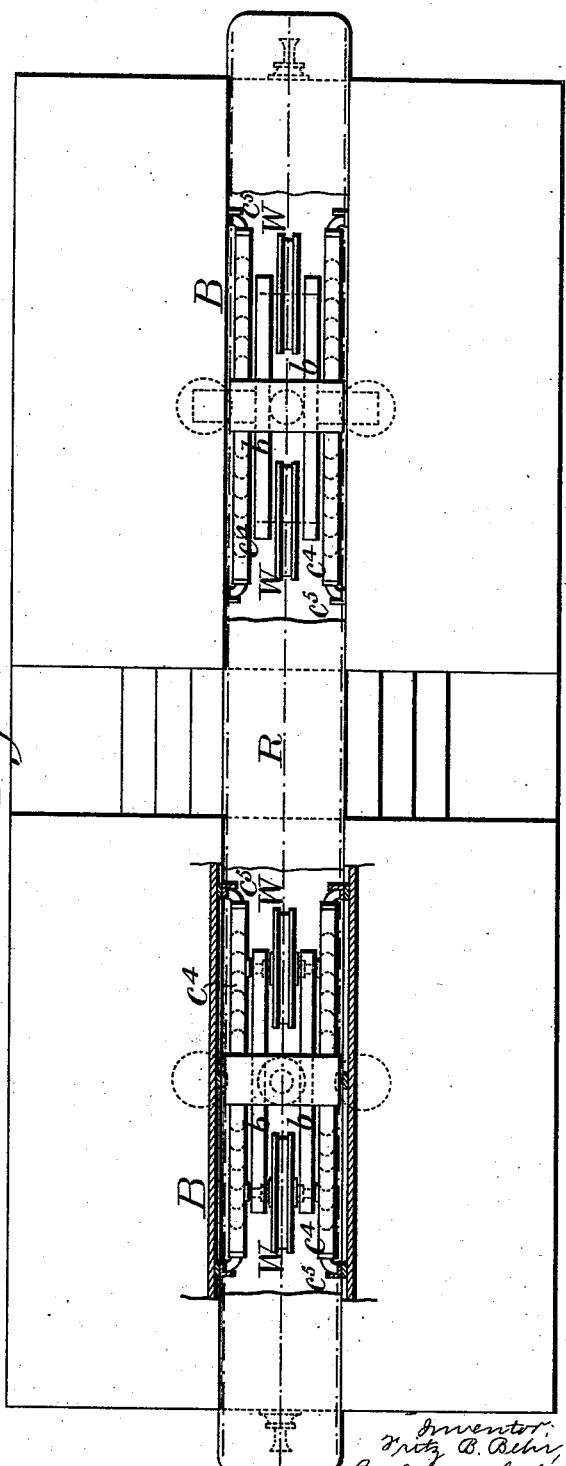

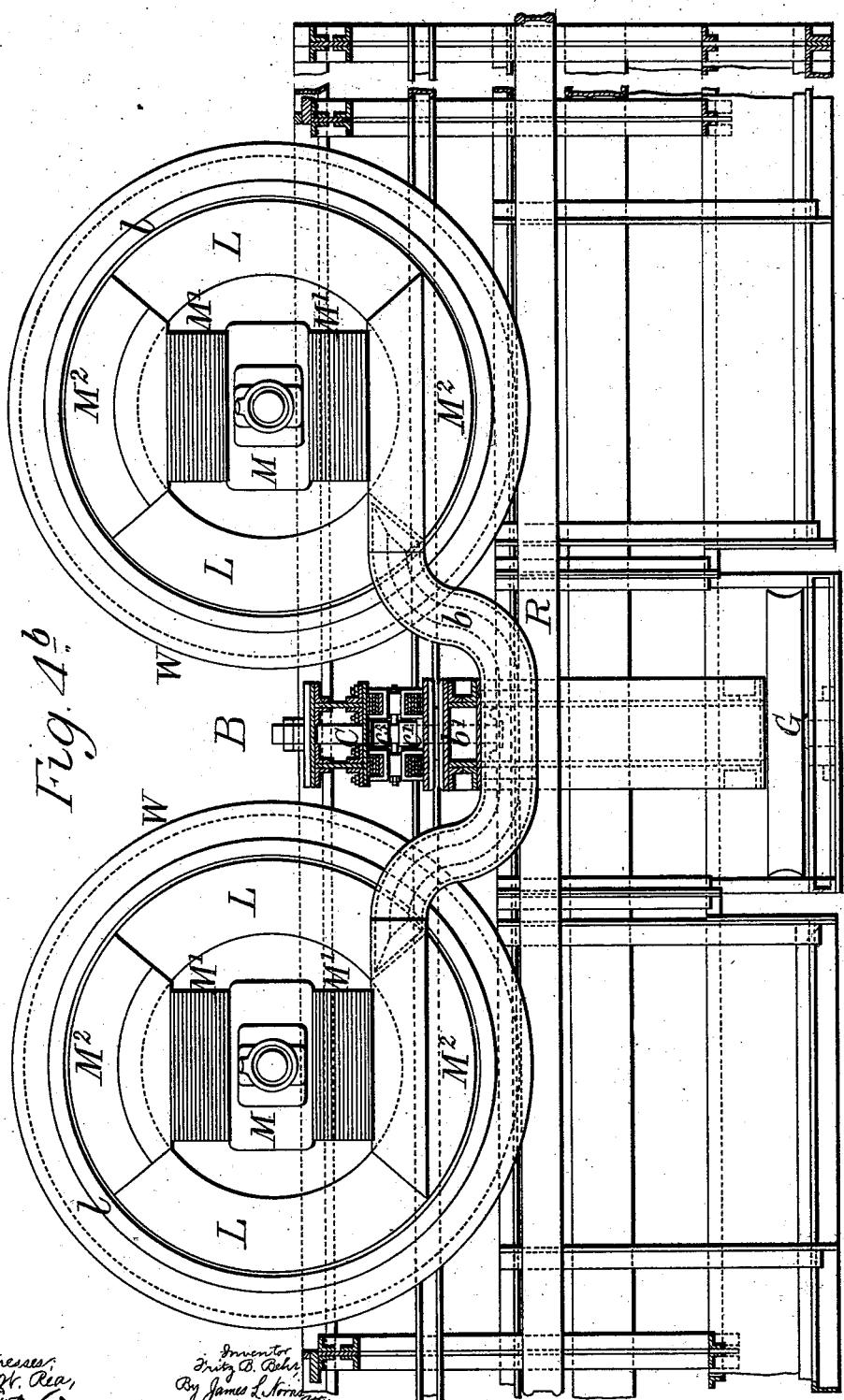

(No Model.) 10 Sheets—Sheet 8.

F. B. BEHR.
ELECTRIC LOCOMOTIVE FOR ELEVATED RAILWAYS.

No. 531,499. Patented Dec. 25, 1894.

(No Model.)　　　　　　　　　　　　　　10 Sheets—Sheet 9.
F. B. BEHR.
ELECTRIC LOCOMOTIVE FOR ELEVATED RAILWAYS.
No. 531,499.　　　　　　　　　　Patented Dec. 25, 1894.
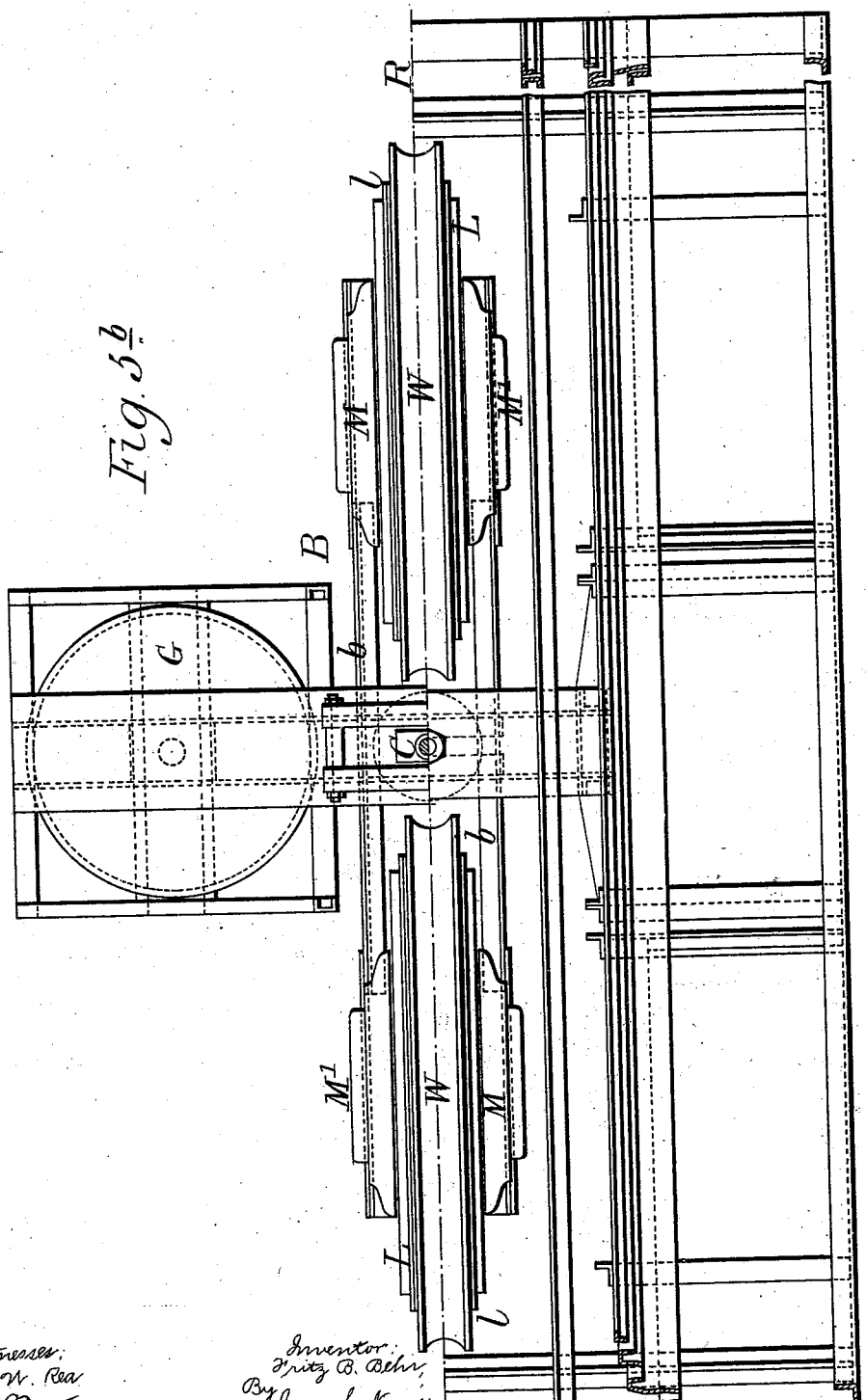

(No Model.)  
10 Sheets—Sheet 10.
F. B. BEHR.
ELECTRIC LOCOMOTIVE FOR ELEVATED RAILWAYS.
No. 531,499. Patented Dec. 25, 1894.
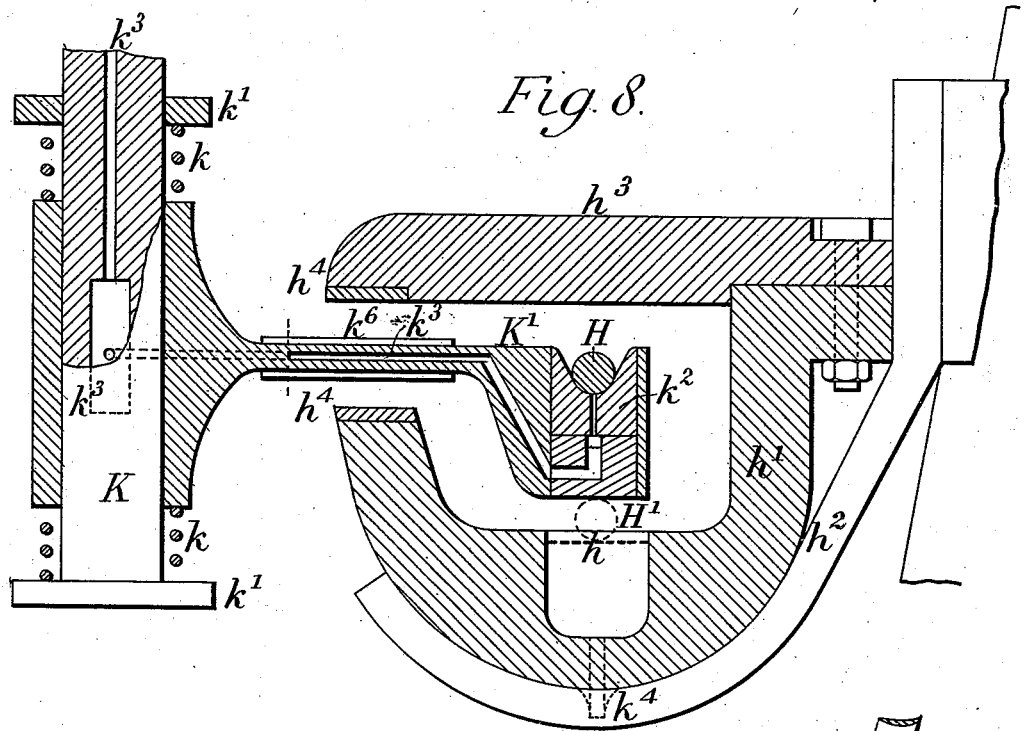
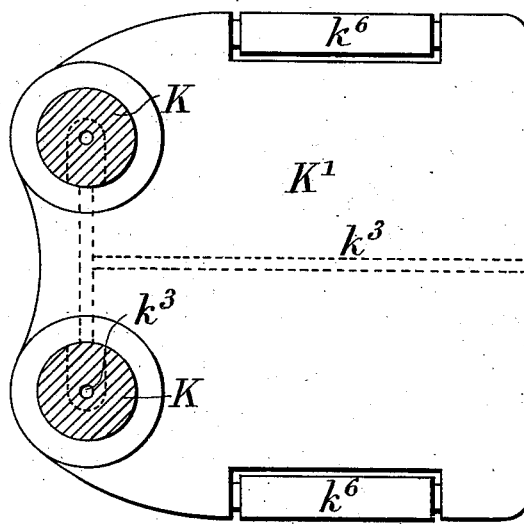
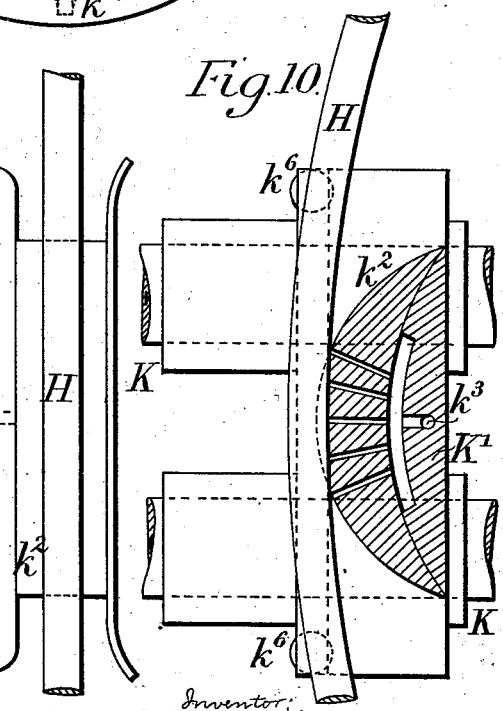

UNITED STATES PATENT OFFICE.

FRITZ BERNHARD BEHR, OF LONDON, ENGLAND.

ELECTRIC LOCOMOTIVE FOR ELEVATED RAILWAYS.

SPECIFICATION forming part of Letters Patent No. 531,499, dated December 25, 1894.

Application filed February 27, 1894. Serial No. 501,668. (No model.) Patented in England July 19, 1893, No. 13,996; in France August 17, 1893, No. 232,201; in Belgium February 5, 1894, No. 108,409; in Switzerland February 7, 1894, No. 8,038; in Hungary March 2, 1894, No. 327; in Italy March 12, 1894, LXX, 155; in Austria March 15, 1894, No. 44/480, and in Austria-Hungary March 21, 1894, No. 47,158 and No. 9,815.

*To all whom it may concern:*

Be it known that I, FRITZ BERNHARD BEHR, a citizen of England, residing at 10 Drapers Gardens, in the city of London, England, have invented certain new and useful Improvements in Vehicles and Electric Locomotives for Single-Line Elevated Railways, (for which I have obtained Letters Patent in Great Britain July 19, 1893, No. 13,996; in France August 17, 1893, No. 232,201, and patent of addition, January 30, 1894, No. 232,201; in Belgium February 5, 1894, No. 108,409; in Switzerland February 7, 1894, No. 8,038; in Austria March 15, 1894, No. 44/480; in Hungary March 2, 1894, No. 327; in Italy March 12, 1894, Vol. LXX, 155, and in Austria-Hungary March 21, 1894, No. 47,158 and No. 9,815,) of which the following is a specification.

This invention relates to the construction of vehicles and electric locomotives for a railway which has a single rail usually elevated on trestles, and lateral guide rails fixed on each side of the trestles, the vehicles being placed astraddle the rail and prevented from canting by horizontal wheels or rollers bearing on the guide rails.

In constructing a vehicle for such a railway according to the present invention, the chief object of which is to provide for steadiness and safety at high speeds, a bogie is formed consisting of a pair of wheels grooved to run on the rail, arranged tandem, with their axle boxes resting on girders, one on each side, these girders being fastened together at the middle between the two wheels. From the middle of each longitudinal girder a foot extends downward and outward, and on this foot is mounted the axle of a horizontal wheel having a groove to take on the lateral guide rails. Through the middle junction of the two girders passes a vertical bolt which constitutes a perch pin, and on the block through which this pin passes is suspended by springs the framing of the vehicle. Each vehicle has two bogies as above described arranged tandem. A train may consist of a single vehicle or of several vehicles connected by joints on which they can turn in the horizontal plane sufficiently to allow for curvatures of the line.

The bogie may be made to constitute an electric locomotive by having each of its wheels arranged to form on each side of it a disk armature and commutator, the coils of the armature revolving close to the sector shaped polar extensions of a vertical electro magnet. When there is such a magnet and a set of armature coils on each side of each wheel the bogie will be driven by four electro motors, and when great power is required each vehicle having its two or three bogies may thus be driven by eight electro motors. The electric currents for the motors may be obtained from accumulators on the train or from a stationary insulated conductor fixed along the line under the path of the vehicles. The conductor is preferably inclosed in a casing having a continuous slot at the side through which passes a stem carrying the rubber, and a stream of water or a current of air may be made to play on the rubber as it makes contact with the conductor to prevent heating.

Such being the general character of the invention I shall explain structural details of the carriages, electrical locomotives and conductor referring to the accompanying drawings.

Figures 1 and 2 are diagrams showing respectively in longitudinal section and plan a pair of the vehicles coupled. Fig. 3 is a transverse section of the carriage through the pivot or perch pin of one of the bogies. Fig. 4 is a part longitudinal section and Fig. 5 is a part sectional plan of the carriage. Figs. 3ª, 4ª and 5ª are views corresponding to Figs. 3, 4 and 5 showing a modification in which blade springs are substituted for helical springs to carry the passenger compartments. Fig. 3ᵇ shows two half transverse sections of the electric locomotive, the right hand taken through the pivot or perch pin of one of the bogies, the left hand through one of the running wheels. Fig. 4ᵇ is a part longitudinal section and Fig. 5ᵇ is a part sectional plan of the locomotive. Fig. 6 is an elevation and Fig. 7 is a plan showing how each of the guide wheels is mounted and pressed against the guide rail. Fig. 8 is a transverse section of the electrical conductor and its casing and the rubber carried by the train. Fig. 9 is a plan of the frame carrying the rubber, and Fig. 10 is a longitudinal section of the rubber.

Each of the bogies B has a framing consisting of two side girders—$b, b$ one arranged on each side of the pair of wheels W, W, and carrying bearings for their axles. These girders are connected together by a block $b'$ between the wheels, and to this block is fixed on each side a frame $b^2$ which projects obliquely down to carry a horizontal guide wheel G which runs along the lateral guide rail $g$.

Fig. 6 is an elevation and Fig. 7 is a plan showing how each of the guide wheels is mounted and pressed against the guide rail.

The wheel G revolves on an axle projecting down from one arm $g'$ of a bell crank lever which is pivoted to the frame $b^2$ at $g^2$ and has its other arm $g^3$ connected to the corresponding arm of the bell crank of the other bogie of the same carriage by a rod $g^4$ on which there is a spring $g^5$ under compression whereby the two arms $g^3$ are urged toward each other, causing the wheels G to press against the rail $g$.

Through the block $b'$ passes a vertical bolt C which operates as a perch pin. It is surrounded by a helical spring $c$ which is compressed between a disk $c'$ that can turn on the lubricated surface of $b'$ and an upper disk $c^2$ to which are fixed girders $c^3$ that extend obliquely downward and form the main framing of the carriage which is built upon the two sets of girders $c^3$ the one set carried on the spring $c$ of the one bogie and the other carried on the spring of the other bogie.

Instead of employing a helical spring $c$, blade springs $c^4$ as shown in Figs. $3^a$, $4^a$ and $5^a$ may have their middles fixed on the disk $c'$ and their ends $c^5$ jointed to the sides of the passenger compartments.

Referring now to Figs. $3^b$, $4^b$ and $5^b$ each bogie B of the locomotive has also a framing consisting of two side girders $b\ b$, one on each side of the two wheels W W which run on the rail R. The girders $b\ b$ are connected between the wheels by a block $b'$ through which passes a vertical bolt C which operates as a perch pin or pivot on which the bogie frame can turn in a horizontal plane. From the girders $b$ and block $b'$ there projects obliquely downward on each side a strong framing carrying at its lower end an open casing in which is mounted one of the horizontal guide wheels G which bears against the guide rail $g$. The bearings for the axles of the guide wheels G may be arranged with springs so as to press the wheels against the guide rails $g$.

On an upward extension of the perch pin C are mounted free to turn two blocks with interposed springs, the lower $c'$ revolving on the lubricated surface of $b'$ and the upper blocks $c^5$ Figs. $3^b$ and $4^b$ to which are attached the frames which carry the passenger compartments of the vehicles. These compartments are thus free to oscillate vertically on the springs without in any way interfering with each bogie which has its pair of wheels W running on the rail R and its pair of guide wheels G running along the guide rails $g$, and which being connected with the passenger compartments only through the perch pin C is free to turn partly round on that as a pivot so as to accommodate itself to curves of the line.

Each of the two wheels on each bogie, that is to say each of the four wheels of the locomotive is arranged to operate as the armature of two electric motors. For this purpose, on each face of each wheel W are fixed a number of bobbins L consisting of segments of thin iron packed together with insulating materials between them, and coiled radially with insulated wire; also on each face of each wheel beyond the coils L are fixed the insulated segments of a commutator $l$ connected to the coils L. To each of the side girders $b$ at each side of each wheel is fixed a field magnet consisting of a middle part M in which is fitted the axle box of the wheel, two coiled parts M' and two polar extensions $M^2$ of segmental form, nearly touching the faces and inner edges of the coils L. Thus each wheel of each bogie is caused to revolve by two electro motors, one on each side of it, these being supplied with current, either from accumulators carried by the train or from a conductor extending along the line. This conductor and the rubber carried by the train for conducting electrically from it to the motors are arranged as shown in Figs. 8, 9 and 10 where H is the conductor in form of a wire rope which usually lies as indicated at H' (Fig. 8) on a grating $h$ or covering a groove formed in a trough $h'$ of insulating material. This trough extends along the line carried on brackets $h^2$ from the trestles and covered by insulating material $h^3$. The edges of $h'$ and $h^3$ at $h^4$ are faced with steel, and these edges are separated by a comparatively small space which is the only opening by which access can be had to the conductor H, the conductor being thus almost entirely inclosed. From any convenient part of the locomotive project downward two bolts K which are insulated from the metal of the train but are connected to the coils of the motor. On these bolts is fitted free to slide between springs $k\ k$ within collars $k'\ k'$ a metal block K in a groove of which is held an arched block of carbon or other conducting material $k^2$ which constitutes the rubber making the contact with the conductor H as it is carried along by the train under the conductor.

In order to provide against excessive heating due to the friction of the rubber, water is forced down holes $k^3$ bored in the bolts K and the block K' and up through holes in the rubber $k^2$, the water being thus directed against the lower side of the conductor H. The spent water flows through the grating $h$ into the groove below and issues from the groove by outlets $k^4$ arranged at intervals. On the plate K' are mounted rollers $k^5$ which run on the faces $k^4$ in case of considerable vertical oscillation.

Having thus described the nature of my said invention and the best means I know of carrying the same into practical effect, I claim—

1. An electric locomotive for a single rail elevated railway having a pair of bogies each consisting of a bogie frame carrying a pair of vertical running wheels and a pair of horizontal guide wheels, and passenger compartments supported on said frames, each of said vertical wheels being mounted between a pair of electro-magnets and provided with coils and a commutator on each of its faces to operate as an electric motor, substantially as described.

2. In a single line elevated railway, the combination with a passenger vehicle and two parallel guide rails, of a pair of bell cranks pivoted to each of the opposite sides of said vehicle, each pair being connected by a rod pivoted to one of said cranks and loosely passing through an eye in the other crank, a spring interposed between the latter crank and a nut on the end of said crank, and guide-wheels journaled in the free ends of said cranks and bearing against said guide rails, substantially as described.

3. In a single line elevated railway, the combination with a covered trough carrying a conductor and provided upon its side with a slot and having suitable outlets, of a carbon contact carried by a support suspended from the locomotive, said carbon and support being provided with a conduit for supplying water to the said conductor, substantially as described.

In testimony whereof I have signed my name to this specification, in the presence of two subscribing witnesses, this 7th day of February, A. D. 1894.

FRITZ BERNHARD BEHR.

Witnesses:
W. J. SUTHERLAND,
JNO. P. M. MILLARD.